United States Patent
Sugita et al.

(10) Patent No.: US 8,580,000 B2
(45) Date of Patent: Nov. 12, 2013

(54) INDIRECT HEAT-DRYING APPARATUS, INDIRECT HEAT-DRYING METHOD OF DRYING SUBSTANCE TO BE DRIED, AND METHOD AND APPARATUS FOR PRODUCING SOLID FUEL

(75) Inventors: Satoru Sugita, Takasago (JP); Yuko Sugita, legal representative, Kobe (JP); Tetsuya Deguchi, Takasago (JP); Takuo Shigehisa, Takasago (JP); Masayasu Ito, Tokyo (JP); Zenji Kato, Tokyo (JP)

(73) Assignees: Kobe Steel, Ltd., Kobe-shi (JP); Tsukishima Kikai Co., Ltd., Tokyo (JP)

( * ) Notice: Subject to any disclaimer, the term of this patent is extended or adjusted under 35 U.S.C. 154(b) by 571 days.

(21) Appl. No.: 12/738,175

(22) PCT Filed: Aug. 21, 2008

(86) PCT No.: PCT/JP2008/064907
§ 371 (c)(1),
(2), (4) Date: Aug. 16, 2010

(87) PCT Pub. No.: WO2009/050939
PCT Pub. Date: Apr. 23, 2009

(65) Prior Publication Data
US 2011/0041393 A1 Feb. 24, 2011

(30) Foreign Application Priority Data
Oct. 16, 2007 (JP) ................................. 2007-269278

(51) Int. Cl.
C10L 5/00 (2006.01)
D06F 58/00 (2006.01)
F26B 11/02 (2006.01)

(52) U.S. Cl.
USPC .................................. 44/626; 44/629; 34/108

(58) Field of Classification Search
USPC ................................ 44/626, 629; 34/108, 371
See application file for complete search history.

(56) References Cited

U.S. PATENT DOCUMENTS

| 4,601,115 | A |   | 7/1986  | Draper et al. |
| 4,970,803 | A | * | 11/1990 | Keller ............................ 34/371 |
| 5,259,756 | A | * | 11/1993 | Urza ............................ 432/103 |
| 5,556,436 | A |   | 9/1996  | Yagaki et al. |
| 6,083,295 | A | * | 7/2000  | Clark ............................ 75/479 |

FOREIGN PATENT DOCUMENTS

| JP | 61 250097 |   | 11/1986 |
| JP | 7 233383  |   | 9/1995  |
| JP | 2005 16898 |   | 1/2005  |
| JP | 2005016898 A | * | 1/2005 |
| JP | 2005 103437 |   | 4/2005 |
| JP | 2005 125130 |   | 5/2005 |

OTHER PUBLICATIONS

English Translation of JP 2005-016898A.*

* cited by examiner

*Primary Examiner* — James Goloboy
*Assistant Examiner* — Latosha Hines
(74) *Attorney, Agent, or Firm* — Oblon, Spivak, McClelland, Maier & Neustadt, L.L.P.

(57) ABSTRACT

The present invention provides an indirect heat-drying apparatus that is resistant to adhesion of the substance to be dried on heating pipes and gives a product having a desired and stabilized liquid content.

The present invention relates to an indirect heat-drying apparatus, comprising two indirect-heating rotary dryers, i.e., the first and second indirect-heating rotary dryers that are arranged in series so that the dried substance from the first indirect-heating rotary dryer is supplied to and dried in the second indirect-heating rotary dryer as the substance to be dried; and a carrier gas-supplying means of supplying the carrier gas co-currently in the first indirect-heating rotary dryer and counter-currently in the second indirect-heating rotary dryer, with respect to the flow direction from the substance to be dried.

3 Claims, 9 Drawing Sheets

INDIRECT HEAT-DRYING APPARATUS, INDIRECT HEAT-DRYING METHOD OF DRYING SUBSTANCE TO BE DRIED, AND METHOD AND APPARATUS FOR PRODUCING SOLID FUEL

TECHNICAL FIELD

The present invention relates to an indirect heat-drying apparatus, including indirect-heating rotary dryers arranged in series therein that are used for drying in wide ranges from constant-rate drying range to decreasing-rate drying range, an indirect heat-drying method of drying a substance to be dried (hereinafter, may be referred to "substance for drying") and a method of producing a solid fuel and a production system by using porous coal as a raw material.

BACKGROUND ART

Steam tube dryers, for example, are known as conventional indirect-heating rotary dryers. Such a steam tube dryer heats and dries a substance to be dried by a plurality of heating pipes installed in a revolving cylinder, into which a heating medium such as steam is introduced. These steam tube dryers are superior in drying potential because the heating area per capacity is large. They are also characteristic in high heat transfer rate and also superior in easiness of operation, and thus have been used for drying coal for coke furnace and chemical products.

The basic structure for these steam tube dryers is shown in FIG. 2. A substance to be dried such as wet or granular powder is brought into contact with heating pipes 311 heated by a heating medium in a revolving cylinder 310 and sequentially fed to and discharged from an outlet port 322 continuously by revolution of the revolving cylinder 310. A heating medium such as heated steam is introduced then into heating pipes 311 through a heating medium inlet pipe 361 installed on a revolution joint 360, fed through each heating pipe 311, and discharged through a heating medium outlet pipe 362. The evaporant from the substance to be dried is discharged, as it is carried in the carrier gas G supplied from an inlet port 341 located to the discharge side of the dried substance, out of the revolving cylinder 310 through an outlet port 342 on the inlet side of the substance to be dried (Patent Document 1).

Traditionally known methods of producing a solid fuel from a raw porous coal include, for example, the method of producing a solid fuel described in Patent Document 2. The method will be described briefly with reference to FIG. 9. A porous coal (raw coal) is pulverized in a pulverization step and mixed with a mixed oil containing a heavy oil fraction and a solvent oil fraction in the mixing step, to give a raw slurry. The raw slurry is then preheated and additionally heated in a vaporization step for further progress of dehydration of the porous coal and impregnation of the mixed oil into the micropores of the porous coal, to give a dehydrated slurry. Then in a solid-liquid separation step, the modified porous coal and the mixed oil are separated from the dehydrated slurry, and the modified porous coal is dried in the final drying step. The dried modified porous coal is cooled and molded as needed, to give a solid fuel. On the other hand, the mixed oil recovered in the solid-liquid separation step and the final drying step is circulated and fed to the mixing step of preparing a raw slurry, for recycle as a circulation oil.

Generally in the final drying step of the method above, the modified porous coal separated in the solid-liquid separation step is dried as it is heated and conveyed in an indirect-heating rotary dryer and a carrier gas is fed thereto. The indirect-heating rotary dryer known is, for example, a so-called steam tube dryer. Specifically, as shown in FIG. 10, a slurry S of the substance to be dried is separated into solid and liquid in a centrifugal separator 101 and the solid is fed into an indirect-heating rotary dryer from a first side (left side in FIG. 10) of a revolving cylinder 105 and the dried substance is discharged out of a discharge chute 106 from a second side (right side in FIG. 10). The carrier gas is then supplied from a particular direction opposite to the conveying direction of the modified porous coal in the dryer, from the viewpoint of drying efficiency (oil recovery efficiency) (see, for example, Patent Document 3). The discharged carrier gas is fed into a wet scrubber 111 for recovery of the fine dust simultaneously conveyed and subjected to spray dust collection, while the liquid containing the liquid separated in centrifugal separator 101 is circulated to the wet scrubber 111, and the dust is captured by spray cooling by using the circulating liquid in the higher region. The solution recovered from the recovery unit is stored temporarily in a storage tank 113, then cooled in a condenser 114, and used for spray cooling.

Patent Document 1: JP-A No. 2005-16898
Patent Document 2: JP-A No. 7-233383
Patent Document 3: JP-A No. 61-250097

DISCLOSURE OF INVENTION

Problems to be Solved by the Invention

However, if a substance to be dried containing fine powder (porous coal in FIG. 10) is dried all at once in wide range from constant-rate drying range to decreasing-rate drying range, the fine powder inevitably scatters out of the revolving cylinder from the first side in greater amount, and consequently, the fine powder should be inevitably collected in a wet dust collector such as a wet scrubber and the scattered dust should be recovered as a slurry, which leads to requirement for a step of processing a great amount of slurry.

When the carrier gas is fed in such a direction, the carrier gas flowing in the dryer is brought into contact with the substance for drying supplied into the dryer in the area of the dryer close to the substance inlet. Then, the carrier gas contains volatile matter sufficiently in the dryer, while the substance to be dried is relatively lower in temperature, because it is not heated sufficiently yet. Thus, the carrier gas is cooled by the substance to be dried, leading to adhesion of the volatile matter on the surface of the substance to be dried by condensation (dewing). As a result, the substance to be dried becomes more viscous, leading to adhesion of the substance to be dried in the area close to the substance inlet on the dryer internal surface, particularly on the heating pipes in the area close to the substance inlet.

Adhesion of the substance to be dried on heating pipes leads to decrease in heat energy transfer efficiency and drying efficiency. The decrease in drying efficiency results in decrease in production efficiency of the solid fuel.

Increase in the amount of adhesion on the heating pipes leads to decrease of the heat transfer coefficient of heating pipes; the heat transfer area should be increased for assurance of a particular capacity; and the dryer should be expanded in size and thus, becomes economically less attractive.

An object of the present invention is to provide an indirect heat-drying apparatus that is resistant to adhesion on heating pipes and gives a product having a desired and stabilized liquid content when a substance to be dried is dried in wide range from constant-rate drying range to decreasing-rate drying range, and a method of drying a substance to be dried.

Another object of the present invention is to provide an indirect heat-drying apparatus that can reduce the amount of scattered dust discharged from the dryer, thus allowing easier dust treatment, and a method of drying a substance to be dried.

Another object of the present invention is to provide a method of producing a solid fuel and a production system resistant to adhesion of porous coal on the dryer internal surface and improved in production efficiency of the solid fuel.

Means to Solve the Problems

The present invention relates to an indirect heat-drying apparatus equipped with a indirect-heating rotary dryer,
wherein the indirect-heating rotary dryer comprising:
a revolving cylinder freely revolving about its axial direction;
a plurality of heating pipes arranged in the revolving cylinder in parallel with the revolving cylinder axis; and
a carrier gas treatment system supplying a carrier gas into the revolving cylinder from one side of the revolving cylinder and discharging the gas with evaporant out of the system from the other side,
a substance to be dried being supplied from a first side of the revolving cylinder and a dried substance being discharged out of a second side opposite thereto,
wherein the indirect-heating rotary dryer comprises a first indirect-heating rotary dryer and a second indirect-heating rotary dryer and the first and second rotary dryer are arranged in series so that a dried substance from the first indirect-heating rotary dryer is supplied to and dried in the second indirect-heating rotary dryer as a substance to be dried, and,
wherein a carrier gas-supplying means of supplying the carrier gas co-currently in the first indirect-heating rotary dryer and counter-currently in the second indirect-heating rotary dryer with respect to the flow direction from substance to be dried to dried substance is provided.

The present invention also relates to an indirect heat-drying apparatus above, further comprising:
a first bag filter for collecting dusts contained in the carrier gas discharged from the first indirect-heating rotary dryer;
a second bag filter for collecting dusts contained in the carrier gas from the second indirect-heating rotary dryer;
and a mixing means of mixing the collected dusts with the dried substance discharged from the first indirect-heating rotary dryer.

The present invention also relates to the indirect heat-drying apparatus above, further comprising carrier gas circulation systems circulating the carrier gas discharged from the first indirect-heating rotary dryer and the carrier gas discharged from the second indirect-heating rotary dryer respectively back to inlet sides, and a cooling means equipped at least in the second carrier gas circulation system to lower the dew point of the carrier gas sent back to the second indirect-heating rotary dryer.

The present invention also relates to an indirect heat-drying method of drying a substance to be dried, characterized in using a plurality of indirect-heating rotary dryers comprising
a revolving cylinder freely revolving about its axial direction,
a plurality of heating pipes arranged in the revolving cylinder in parallel with the revolving cylinder axis, and
a carrier gas treatment system supplying a carrier gas into the revolving cylinder from one side of the revolving cylinder and discharging the gas with evaporant out of the system from the other side,
a substance to be dried being supplied from a first side of the revolving cylinder and a dried substance being discharged out of a second side opposite thereto, and
comprising
a first drying step of drying the substance to be dried as the carrier gas is supplied co-currently to a conveying direction of the substance to be dried in the first indirect-heating rotary dryer, and
a second drying step of drying the dried substance to be dried as the carrier gas is supplied counter-currently to a conveying direction of the substance to be dried in the second indirect-heating rotary dryer.

The present invention also relates to the above indirect heat-drying method of drying a substance to be dried, wherein a dew point of the carrier gas supplied to the second indirect-heating rotary dryer is lower than that of the carrier gas supplied to the first indirect-heating rotary dryer.

The present invention also relates to a method of producing a solid fuel, comprising;
a mixing step of obtaining a raw slurry by mixing a porous coal with a mixed oil containing a heavy oil fraction and a solvent oil fraction;
a vaporization step of obtaining a dehydrated slurry by heating the raw slurry for progress of dehydration of the porous coal and impregnation of the mixed oil into micropores of the porous coal;
a solid-liquid separation step of separating the modified porous coal and the mixed oil from the dehydrated slurry; and
a final drying step of drying the separated modified porous coal by supplying a carrier gas over it while heating and conveying it,
wherein the indirect heat-drying method of drying a substance to be dried, which is described above, is carried out in the final drying step.

The present invention also relates to an apparatus for producing a solid fuel, comprising;
a mixing means of obtaining a raw slurry by mixing a porous coal with a mixed oil containing a heavy oil fraction and a solvent oil fraction;
a vaporization means of obtaining a dehydrated slurry by heating the raw slurry for progress of dehydration of the porous coal and impregnation of the mixed oil into micropores of the porous coal;
a solid-liquid separation means of separating the modified porous coal and the mixed oil from the dehydrated slurry; and
a drying means of drying the separated modified porous coal by supplying a carrier gas over it while heating and conveying it,
wherein the drying means is an indirect heat-drying apparatus, which was described above.

Effects of the Invention

In the indirect heat-drying apparatus, the indirect heat-drying method of drying a substance to be dried, the method of producing a solid fuel and the production system according to the present invention, a first indirect-heating rotary dryer and a second indirect-heating rotary dryer are arranged in series and the carrier gas is supplied co-currently in the first indirect-heating rotary dryer and counter-currently in the second indirect-heating rotary dryer with respect to the conveying direction of the substance to be dried. Such a combination provides many advantages.

Specifically, the substance to be dried at the outlet port of the first indirect-heating rotary dryer, which has a liquid content of close to the marginal liquid content, still contains liquid components and thus prevents generation of dust. Since a carrier gas not containing evaporant is supplied into the substance inlet side, i.e., the carrier gas inlet side, of the first indirect-heating rotary dryer, the dew point of the carrier gas is low, suppressing adhesion on heating pipes even when the liquid content of the substance to be dried is higher. The carrier gas contains evaporant and has a higher dew point on the carrier gas outlet side, i.e., the substance outlet side of the first indirect-heating rotary dryer, but the temperatures of the substance to be dried and the carrier gas are higher, and the temperature difference between the gas and the dew point is relatively large, thus preventing dewing.

In the second indirect-heating rotary dryer, the substance to be dried, supplied from the first indirect-heating rotary dryer, is heated to higher temperature and dried close to the marginal liquid content and thus, dewing or adhesion in the carrier gas outlet side, i.e., the substance inlet side, of the second indirect-heating rotary dryer is avoided even when the substance to be dried is supplied. Fine powder is carried as dust in the carrier gas when the substance to be dried is dried, but the powder is captured by the substance to be dried plowed on the carrier gas outlet side, i.e., the substance inlet side of the second indirect-heating rotary dryer, and thus, the amount of the dust discharged out of the system is reduced. In addition, because a carrier gas not containing evaporant is supplied into the substance outlet side, i.e., the carrier gas inlet side of the second indirect-heating rotary dryer, the carrier gas has a low dew point, which is advantageous for progress of decreasing-rate drying.

It is also possible according to the present invention, to collect dust at high dust-collecting efficiency and low liquid content of collected-dust, and to reduce the amount of the slurry to be processed, because bag filters can be used for recovery of scattered dust.

It is also possible according to the present invention, to reduce utility consumption and thus energy cost required for drying, by making each dryer have a separate carrier gas circulation system containing cooling means (such as condenser) and by making the dew point of the carrier gas supplied to the second indirect-heating rotary dryer lower than that of the carrier gas supplied to the first indirect-heating rotary dryer.

In particular, it is possible according to the method of producing a solid fuel and production system according to the present invention, to reduce adhesion of the porous coal on the dryer internal surface and thus, to raise drying efficiency and consequently improve production efficiency of solid fuel.

EXPLANATION OF REFERENCE NUMERALS

Figure 1:
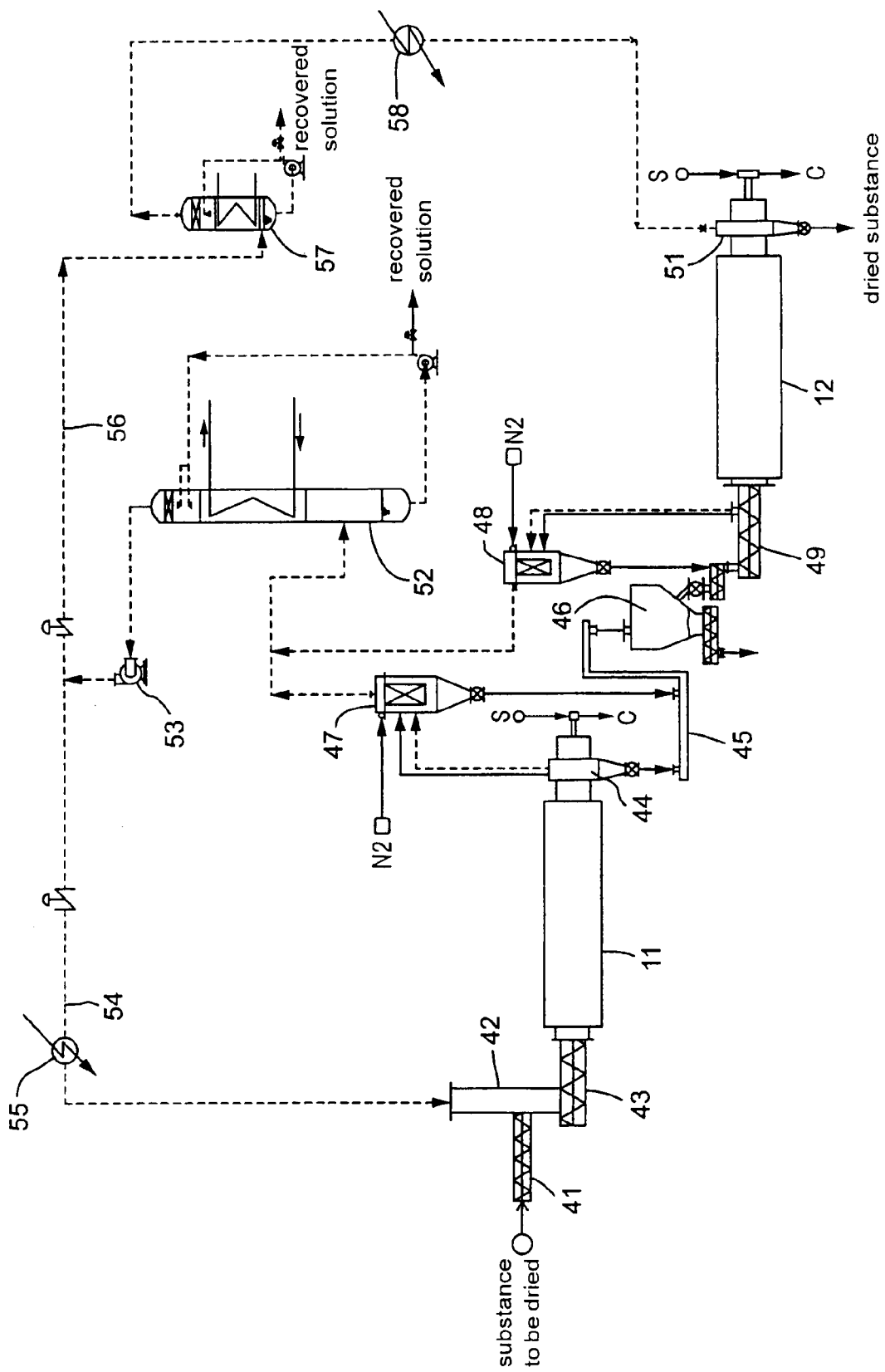
FIG. 1 is a schematic view showing an embodiment of an indirect heat-drying apparatus according to the present invention.

2: Mixing tank, 3: Heat exchanger, 4: Vaporizer, 5: Solid-liquid separation device, 6: Drying apparatus, 10: Modified porous coal (cake), 11: First indirect-heating rotary dryer (first dryer), 11a: First steam-tube dryer, 12: Second indirect-heating rotary dryer (second dryer), 12a: Second steam-tube dryer, 13: Gas cooler, 14: Gas heating device, 15: Dust-collecting device, 16: Heater, 41: Screw conveyor, 42: Supply cylinder, 43: Screw conveyor, 44: Discharge casing, 45: Conveyor, 46: Temporary reservoir, 47: First bag filter, 48: Second bag filter, 49: Screw conveyor, 51: Discharge casing, 52: Cooling tower, 53: Blower, 54: Circulation route, 55: Heating device, 56: Circulation route, 57: Second cooling tower, 58: Heating device, 310: Revolving cylinder, 311: Heating pipe, 321: Inlet port, 322: Outlet port, 331a: 331b: Support stand, 330a: 330b: Support roller, 312a: 312b: Tire, 350: Follower gear, 353: Drive gear, 351: Motor, 352: Speed reducer, 360: Revolving joint, 361: Heating medium inlet pipe, 101: Centrifugal separator, 102: Screw feeder, 103: Supply cylinder, 104: Screw feeder, 105: Revolving cylinder, 106: Discharge chute, 110: Screw feeder, 111: Wet scrubber, 112: Heating device, 113: Storage tank, 114: Condenser.

BEST MODE FOR CARRYING OUT THE INVENTION

Indirect Heat-Drying Apparatus and Indirect Heat-Drying Method

Preferred embodiments of the indirect heat-drying apparatus and the indirect heat-drying method according to the present invention will be described in detail with reference to FIG. 1. An example of the flow of drying treatment according to the present invention aimed at drying a brown coal slurry previously pulverized is described in the embodiment, wherein two dryers, a first indirect-heating rotary dryer responsible for constant-rate drying range (hereinafter, may be referred to as "first dryer") 11 and a second indirect-heating rotary dryer responsible for decreasing-rate drying range (hereinafter, may be referred to "second dryer") 12, are arranged in series. The dashed line shows the flow route of a carrier gas, while the solid line shows the flow route of a substance to be dried (brown coal). The carrier gas used is nitrogen gas, because the substance to be dried in the present embodiment is brown coal, which is a combustible substance. The substance to be dried is not restricted to brown coal, and examples thereof include those that should be dried in processing in the decreasing-rate drying range, including other porous coals such as lignite and subbituminous coal; biomasses, petrochemical products such as terephthalic acid, foods and the like. If the substance to be dried is not a combustible substance, the carrier gas used may not be nitrogen gas, and other gases such as air can be used.

The structure of the first and second dryers 11 and 12 is not particularly limited, if they have a revolving cylinder freely revolving around its axial direction, a plurality of heating pipes arranged in the revolving cylinder in parallel with the revolving cylinder axis, and a carrier gas treatment system supplying a carrier gas into the revolving cylinder from one side of the revolving cylinder and discharging the gas with evaporant out of the system from the other side, while a substance to be dried is fed into the revolving cylinder from the first side and discharged from the other second side. In the present invention, the carrier gas is supplied co-currently in the first dryer 11 and counter-currently in the second dryer 12, with respect to the flow direction from substance to be dried to dried substance (conveying direction of substance to be dried).

Figure 2:
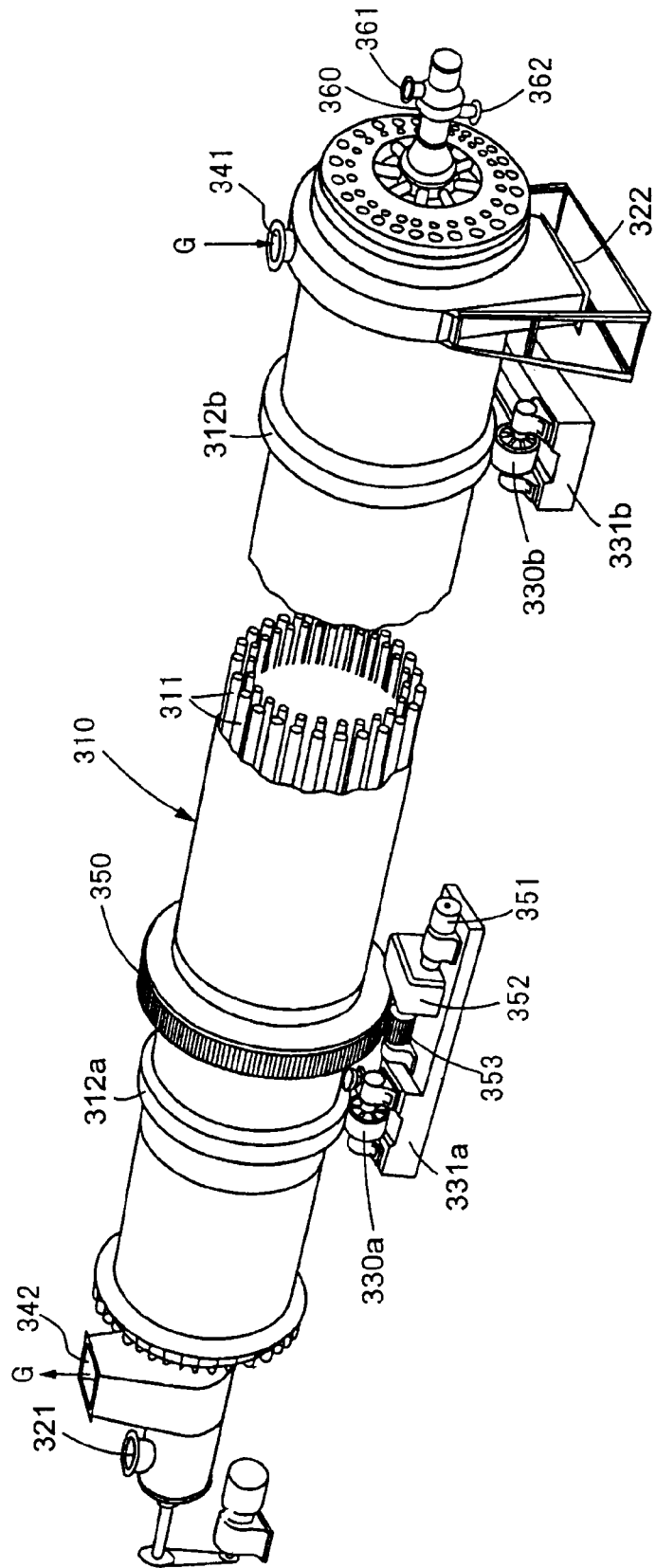
FIG. 2 is a schematic view illustrating a structure of an example of a steam tubular dryer.

A specific example of the first and second dryers 11 and 12 is the steam tube dryer shown for example in FIG. 2. In the steam tube dryer, the substance to be dried is dried under heat as it is conveyed through the heating pipes 311, while a heating medium such as steam is fed into a plurality of heating pipes 311 installed in a revolving cylinder 310. Such a steam tube dryer, which advantageously has a large heating area per capacity, is thus superior in its large drying potential, characteristic in its high heat transfer rate, and advantageous in that the operation and handling are easier, and thus have been used commonly.

The size of the steam tube dryer is not particularly limited, but generally, the revolving cylinder 310 has a length of 5 to 30 m. In the revolving cylinder 310, a substance to be dried such as powder or granule is brought into contact with heating pipes 311 heated with a heating medium and conveyed sequentially to the outlet port 322 by revolution of the revolving cylinder 310 continuously. Thus, the revolving cylinder 310 is placed on a descending slope, so that the substance to be dried is conveyed smoothly from the substance to be dried inlet port 321 at one end to the dried substance outlet port 322. The revolving cylinder is mounted via tires 312a and 312b on support rollers 330a and 330b respectively formed on support stands 331a and 331b at two positions. The descending slope is adjusted by the height and the angle of the support stands 331a and 331b, and the support rollers 330a and 330b at two positions. For revolution of the revolving cylinder 310, a follower gear 350 is formed on the periphery of the revolving cylinder 310 and a drive gear 353 is connected thereto. The revolving force of a motor 351 is transmitted through a speed reducer 352, and the revolving cylinder revolves around the axis.

In the steam tube dryer, a plurality of heating pipes 311 are placed between both ends of the revolving cylinder 310 in parallel with the axis, and heated steam as a heating medium is supplied into these heating pipes 311 through a heating medium inlet pipe 361 attached in a revolution joint 360, fed through the heating pipes 311, and discharged from a heating medium outlet pipe 362.

On the other hand, the evaporant from the substance to be dried is discharged out of the revolving cylinder 310, as contained in the carrier gas G. In FIG. 2, the carrier gas G is supplied from the inlet port 341 on the dried substance-discharging side and discharged from the outlet port 342 on the substance-feeding side, and the direction of the carrier gas flow is counter-current with respect to the substance-conveying direction, and therefore, the steam tube dryer shown in FIG. 2 can be used as the second dryer 12. If it is used as the first dryer 11, the carrier gas flow direction is reversed, by using the carrier gas outlet port 342 as inlet port and the inlet port 341 as outlet port.

The constant-rate drying range (first drying step) will be described. In FIG. 1, the substance to be dried is supplied into the first dryer 11 through a screw conveyor 41, a supply cylinder 42 and a screw conveyor 43. The half-dried substance dried in the first dryer 11 is sent from a bottom of a discharge casing 44 to a conveyor 45 and then, temporarily into a reservoir 46. The liquid content of the substance to be dried in the outlet region of the first dryer 11 is, for example, 4.5%.

The carrier gas is fed into the first dryer 11 from the substance inlet side, captures evaporant from the substance to be dried and additionally dust scattered into the carrier gas during drying of the substance to be dried in the first dryer 11, and is discharged out of the system from the substance outlet side of the first dryer 11 and sent to a first bag filter 47.

The dust separated in the first bag filter 47 is sent to a conveyor 45 and is finally fed to the second dryer 12 as the substance to be dried.

The dust-free carrier gas is sent to a cooling tower 52, where it is cooled. The cooled carrier gas is blown by a carrier gas-supplying means 53 along a circulation route 54 into the supply cylinder 42, as it is heated to a particular temperature in an intermediate heating device 55.

The decreasing-rate drying range (second drying step) will be described hereinafter. The half-dried substance is discharged from the temporary reservoir 46 and sent into a second dryer 12 by a supply screw conveyor 49. The dried substance dried in the second dryer 12, is discharged out of the system from a bottom of a discharge casing 51 via the discharge casing 51 for further treatment.

The carrier gas is blown counter-currently into the second dryer 12. The carrier gas is blown into the second dryer 12 from the dried substance outlet side and discharged from the substance inlet side. The carrier gas discharged from the substance inlet side is sent to a second bag filter 48.

The dust separated in the second bag filter 48 is sent to a screw conveyor 49 as the substance to be dried in the second dryer 12.

The dust-free carrier gas is fed into a common-use cooling tower 52, where it is cooled. The cooled carrier gas is sent to the second cooling tower 57, where it is cooled further, and to an intermediate heating device 58 where it is heated to a particular temperature, along the circulation route 56 by a common-use carrier gas-supplying means 53, and blown into the second dryer 12 from the dried substance outlet side through the discharge casing 51 region.

A part of the circulating liquids in the cooling tower 52 and the second cooling tower 57 are discharged out of the system as recovered solution. Nitrogen gas $N_2$ is blown into the dryers 11 and 12 under pressure. The nitrogen gas $N_2$ is supplied specifically, for example, into the first bag filter 47 and the second bag filter 48.

A reference mark S represents the steam fed into the heating pipe, and a reference mark C represents the condensate.

Preferably in the present embodiment, as shown in FIG. 1, the first bag filter is installed for dust collection of the carrier gas discharged from the first dryer and the second bag filter for dust collection of the carrier gas discharged from the second dryer, and additional mixing means of mixing the dust respectively collected with the dried substance discharged from the first dryer is installed. Thereby, such advantages as described below are obtained. Generally, a bag filter is used preferably for collection and recovery of scattered dust contained in the exhaust gas from the dryer. Bag filter systems can recover dust, including small particle size dust, at high dust-collecting efficiency and also at a low liquid content of collected dust, compared to wet scrubber and other systems.

Such a bag filter does not demand wastewater treatment, which is essential in wet scrubber systems. However if the carrier gas has high dew point, such a system cannot be used because of dewing on the bag filter. According to the present invention, bag filters can be used for the following reasons. In the first dryer, the carrier gas contains the evaporant and thus has a high dew point in the carrier gas outlet side or the substance outlet side of the dryer, but the substance to be dried is dried more progressively, and the temperatures of the substance to be dried and the gas are higher. For that reason, the temperature difference between the gas temperature and the dew point can be expanded for prevention of dewing on the first bag filter. The scattered dust is collected in the first bag filter and fed into the second dryer, wherein it is further dried, and thus, is never left as undried substance. In the second dryer, the substance to be dried is dried and heated in the first dryer approximately to the marginal liquid content, and thus, it is possible to expand the temperature difference between the carrier gas temperature and the dew point and thus to reduce dewing on the second bag filter installed for the second dryer. Although the scattered dust may not be held in the second dryer for a particular residence time needed, the dust is collected in the second bag filter, mixed with the dried substance discharged from the first dryer, and supplied into the second dryer once again, and thus, the dust cannot become undried substance. The mixing means may be, for example, a device feeding the dust to the conveying device of the dried substance discharged from the first dryer or a device feeding the dust to a hopper temporarily storing the dried substance, and the dust collected in the first and second bag filters may be circulated separately or in combination. Dust collection from the carrier gas discharged from the first dryer and the carrier gas discharged from the second dryer may be carried out separately, as described above, or simultaneously together. The collected dust may be mixed with the dried substance discharged from the first dryer, as described above, or may be used as a product without mixing.

In the present embodiment, as shown in FIG. 1, it is preferable to lower the dew point of the carrier gas fed into the second dryer, by installing a first carrier gas circulation system feeding the mixed carrier gas in combination of the carrier gas discharged from the first dryer and the carrier gas discharged from the second dryer back into the first dryer, a second carrier gas circulation system feeding it back to the second dryer, and additionally cooling means at least within the second carrier gas circulation system. Thereby, such advantages described below are abtained. When decreasing-rate drying is carried out in the second dryer, it is generally advantageous to reduce the dew point of the carrier gas, for reduction of the final liquid content and the residence time needed. For that purpose, it is needed, if the carrier gas is circulated in circulation system, to lower the gas temperature once, for example by a condenser, and then raise the temperature by heating before supply to the dryer for recovery of the evaporant by condensation. If the mixed carrier gas discharged from the first and second dryers is circulated in a system having a common cooling means (such as condenser), the carrier gas sent back to the first dryer also has a dew point similar to that of the carrier gas sent back to the second dryer. Such operation only leads to increase of the utility consumption for cooling and heating the carrier gas for decrease of the dew point of the carrier gas. Thus, the mixed carrier gas discharged from the first and second dryers is circulated separately though a first carrier gas circulation system supplying it into the first dryer and a second carrier gas circulation system supplying it into the second dryer, and the carrier gas sent to the second dryer is sufficiently cooled selectively, for decrease of the dew point. In this way, the dew point of the carrier gas supplied to the second dryer becomes lower than the dew point of the carrier gas supplied to the first dryer. The utility consumption and the energy cost needed for drying can be reduced in this way.

Method of Producing a Solid Fuel from a Porous Coal as Raw Material and Production System Embodiments of the method of producing a solid fuel according to the present invention will be described in detail with reference to FIGS. 3 to 7.

In the present embodiment, a solid fuel is produced from a porous coal, fundamentally through:

a mixing step of obtaining a raw slurry by mixing a porous coal with a mixed oil containing a heavy oil fraction and a solvent oil fraction;

a vaporization step of obtaining a dehydrated slurry by heating the raw slurry for progress of dehydration of the porous coal and impregnation of the mixed oil into micropores of the porous coal;

a solid-liquid separation step of separating a modified porous coal and a mixed oil from the dehydrated slurry; and a final drying step of drying the separated modified porous coal by supplying a carrier gas over it while heating and conveying it.

In the present invention, the indirect heat-drying method of drying a substance to be dried is carried out in the final drying step, among the production steps above. A first drying step in which the carrier gas is supplied co-currently to the modified porous coal-conveying direction and a second drying step in which the carrier gas is supplied counter-currently to the modified porous coal-conveying direction are carried out sequentially.

Each step will be described in detail hereinafter. In the mixing step, a porous coal is mixed with a mixed oil containing a heavy oil fraction and a solvent oil fraction, to give a raw slurry (mixing step in FIG. 3).

Porous coal contains a great amount of water, and is a so-called low-quality coal desired to be dehydrated and a coal containing water, for example, in an amount of 20 to 70 wt %. Examples of such porous coals include brown coals, lignite, subbituminous coals, and the like. Examples of the brown coals include Victoria coal, North Dakota coal, Beluga coal, and the like. Examples of the subbituminous coals include West Banco coal, Binungan coal, Samarangau coal, Ecocoal, and the like. The porous coals are not limited to those exemplified above, and any coal containing water in a great amount and thus desired to be dehydrated is also included and may be used as the porous coal according to the present invention. Such a porous coal is normally pulverized previously for use (pulverization step in FIG. 3). The particle size of the porous coal is not particularly limited, and the coal may have, for example, an average particle size of about 0.05 to 2.0 mm, and in particular 0.1 to 0.5 mm.

The heavy oil fraction is a heavy fraction, such as vacuum residue oil, that substantially has no vapor pressure, for example, even at 400° C. or an oil containing the same much. Thus, the porous coal itself is decomposed thermally if only a heavy oil fraction is used and heated to a fluidity allowing penetration of the oil into the micropores of the porous coal. As described above, because the heavy oil fraction for use in the present invention has almost no vapor pressure, it is more impossible to vaporize and distill it in carrier gas flow. If only a heavy oil fraction is used, it is difficult to obtain a preferable slurry because of high viscosity, and also to make it penetrate into the micropores because of almost no volatility. Thus, use of a solvent or a dispersant is needed.

Thus, in the present invention, the heavy oil fraction is dissolved in a solvent oil fraction for improvement in impregnation processability and slurry-forming efficiency, and then used. The solvent oil fraction for dispersing the heavy oil fraction is preferably a low-temperature-boiling oil fraction from the viewpoints of compatibility with the heavy oil fraction, handleability as slurry, easiness in penetration into micropores, and others, but, considering the stability at water vaporization temperature, use of a petroleum oil having a boiling point of 100° C. or higher, and preferably 300° C. or lower (for example, light oil or heavy oil) is recommended. Use of such a heavy oil fraction-containing mixed oil, which has suitable fluidity, permits accelerated penetration into micropores that is not possible only with a heavy oil fraction.

Such a heavy oil fraction-containing mixed oil may be (a) a mixed oil originally obtained as a mixed oil containing a heavy oil fraction and a solvent oil fraction, or (b) a mixed oil prepared by mixing a heavy oil fraction with a solvent oil fraction. Examples of the former oils (a) include petroleum heavy oil; petroleum light oil fractions, kerosene fraction, and lubricating oil components containing unpurified heavy oil; coal tar; light oils and kerosenes unintentionally containing impurities of heavy oil as they were used as a solvent or cleaner; heat transfer oils containing degradation products by repeated use; and the like. Examples of the latter oils (b) for use include petroleum asphalt, natural asphalt, coal-based heavy oils, petroleum or coal-based vaporization residues, or oils containing these in large amounts, mixtures thereof with petroleum light oil, kerosene, lubricating oil, or the like; mixtures of the former mixed oil (a) prepared by dilution thereof with petroleum light oil, kerosene or lubricating oil; and the like. Asphalts, which are inexpensive and characteristic in that they are not easily liberated when deposited on active sites, are used particularly preferably.

The content of the heavy oil fraction in the mixed oil is normally in the range of 0.25 to 15% by weight, with respect to the total amount of the mixed oil.

The mixing rate of the mixed oil to the porous coal is not particularly limited, and normally, the mixing ratio of the heavy oil fraction to the porous coal is preferably in the range of 0.5 to 30%, particularly 0.5 to 5% by weight, with respect to the anhydrous coal. Excessively low mixing ratio of the heavy oil fraction leads to insufficient absorption into micropores and thus to decrease in autoignition-reducing efficiency. Excessively high mixing ratio of the heavy oil fraction leads to decrease in economical advantage because of the oil cost.

The mixing conditions are not particularly limited, and mixing is normally carried out at 40 to 100° C. under atmospheric pressure.

Figure 3:
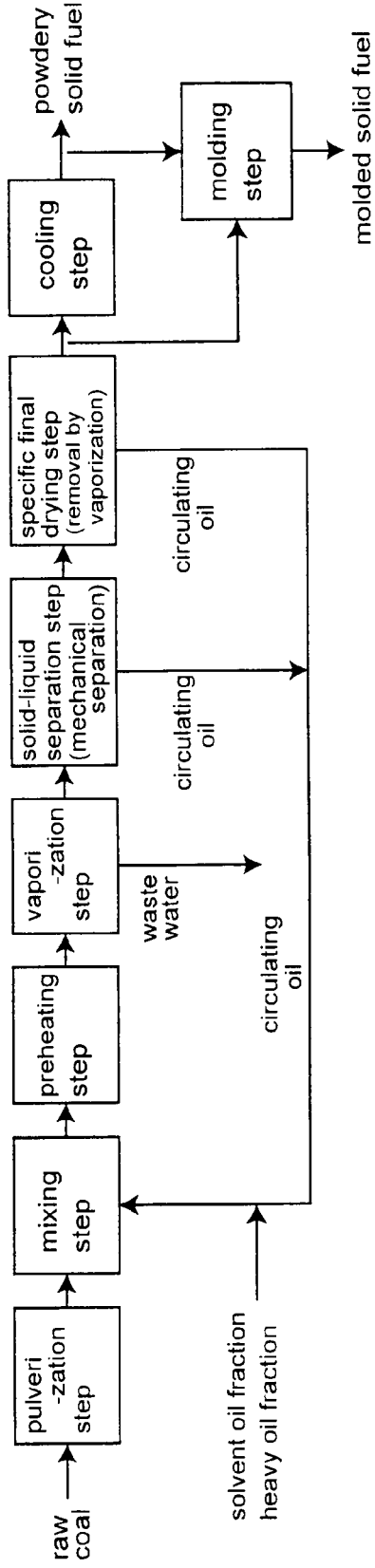
FIG. 3 is a process flow chart showing an embodiment of the method of producing a solid fuel according to the present invention.
Figure 4:
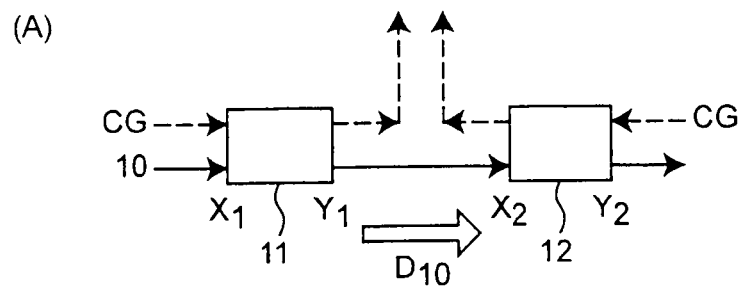
FIGS. 4(A) and 4(B) each is a schematic view showing an embodiment of a final drying step in the method of producing a solid fuel according to the present invention.

The raw slurry obtained in the mixing step is normally preheated before the vaporization step (preheating process in FIG. 3). The preheating process may be eliminated.

The preheating conditions are not particularly limited, and the raw slurry is normally heated almost to the water-boiling point under operational pressure.

In the vaporization step, a dehydrated slurry is obtained by heating the raw slurry for progress of dehydration of the porous coal and impregnation of the mixed oil into the micropores of the porous coal (vaporization step in FIG. 3). Specifically, the raw slurry is heated, for example, to 100 to 250° C. In this way, the mixed oil deposits in the open micropores of the porous coal from which water is removed by vaporization. The mixed oil deposits and covers the micropores with progress of vaporization of the water in micropores. Even if there is some residual steam, negative pressure is formed during condensation thereof in the cooling process, leading to absorption of the heavy oil fraction-containing mixed oil into the micropores, and thus, the micropore internal surface layer is coated with the heavy oil fraction-containing mixed oil, until all regions of the micropore openings are filled with the heavy oil fraction-containing mixed oil. In addition, the heavy oil fraction in the mixed oil is absorbed easily in active sites selectively and less easily separated once it deposits thereon, suggesting that it will be coated more preferentially than solvent oil fraction. Blockage of the micropore internal surface from external air in this way leads to disappearance of spontaneous combustion. Elimination of a great amount of water by dehydration and preferential saturation of all micropores with a heavy oil fraction-containing mixed oil, in particular with a heavy oil fraction, leads to increase in calorie of the porous coal as a whole.

Heating is preferably carried out under a pressure, normally at 200 to 1500 kPa.

Because the series of steps is normally carried out by continuous operation, the heating time cannot be specified definitely, so far as dehydration of the porous coal and impregnation of the mixed oil into micropores are possible.

The steam generated by heating is removed in the vaporization step. The steam generated and removed in the step can be recovered and used as a heat source in the preheating and vaporization steps after pressurization.

In the solid-liquid separation step, a modified porous coal and a mixed oil are separated from the dehydrated slurry (solid-liquid separation step in FIG. 3).

Various methods can be used as the separation method, and examples thereof include centrifugation, sedimentation, filtration, compression. and the like. These methods may be used in combination. The method for use is preferably centrifugation, from the viewpoint of separation efficiency.

The solid (modified porous coal) separated and recovered in the solid-liquid separation step normally contains the mixed oil and is still wet. Thus it needs to be dried (final drying step in FIG. 3).

The drying method for use is preferably an indirect heat-drying method of drying a substance to be dried, including a first drying step in which the carrier gas is supplied co-currently to (in parallel with) the modified porous coal-conveying direction and a second drying step in which the carrier gas is supplied counter-currently to (in reverse parallel with) the modified porous coal-conveying direction are carried out sequentially.

For example as shown in FIGS. 4(A) and 4(B), a first dryer 11 for the first drying step and a second dryer 12 for the second drying step are arranged in order in the direction $D_{10}$ conveying the modified porous coal 10, and a carrier gas (CG) is supplied in the co-current (same) direction to the modified porous coal-conveying direction $D_{10}$ in the first dryer 11 and the carrier gas (CG) is supplied in the counter-current (opposite) direction to the modified porous coal-conveying direction $D_{10}$ in the second dryer 12. The first dryer, the first drying step, the second dryer, and the second drying step are the same as those described in the indirect heat-drying method of drying a substance to be dried above.

Flow of the carrier gas in such particular directions can reduce adhesion of the porous coal on the dryer internal surface. Although the mechanism is not understood in detail, it is seemingly based on the following mechanism: When a sufficiently wet material is dried, it is dried in a preheating range, a constant-rate drying range, and a decreasing-rate drying range. In the constant-rate drying range, the material temperature is almost constant and the heat applied to the material is all used for vaporization of oil. In the decreasing-rate drying range, the material temperature rises, forming a temperature distribution in the material. In the present invention, the modified porous coal cake and the carrier gas move co-currently in the first drying step and the cake is always exposed to a less oil-containing carrier gas in the inlet side of the first dryer $X_1$. Thus in the first drying step, the cake surface is kept dry; the drying progresses to the final point of constant-rate drying range before the cake is conveyed to the outlet side $Y_1$; and the oil present on the porous-coal surface portion in a relative large amount is separated by vaporization. In the second drying step, the cake and the carrier gas move counter-currently, but the cake from which most oil is previously removed by vaporization flows into the inlet side $X_2$. Thus, also in the second drying step, the cake surface is kept dry; the drying progresses to the final point of decreasing-rate drying range before the cake advances to the outlet side $Y_2$; and the residual oil in the porous coal diffuses and exudes onto the surface and removed by vaporization. As described above, the two-stage drying seems to be effective in preventing deposition of the porous coal on the dryer internal surface, because condensation of the vaporized oil is prevented effectively, and the cake surface is kept dry, while the oil contained in the porous coal is removed by vaporization in the final drying step. The second drying step is a drying step in the decreasing-rate drying range, only demanding a particular residence time, wherein steam consumption by oil vaporization is small and most of the steam heat is used for thermal preservation in the second drying step. Thus, only tubes needed for thermal preservation and agitation are desirably installed in the second dryer, and the apparatus in the second drying step can be simplified and the steam consumption is reduced.

The entire configuration of the first dryer 11 and the second dryer 12 may be an indirect connection type in which the two dryers are connected to each other via a connecting unit, as shown in FIG. 4(A), or a direct connection type in which the two dryers are connected to each other directly, as shown in FIG. 4(B). The former configuration is desirable, from the viewpoint of simplicity of the drying apparatus structure. Particularly in the latter case, the dryer may be divided into a first drying unit (first dryer) and a second drying unit (second dryer), and the carrier gas may be supplied into the first and second drying units in particular directions.

The first and second dryers are indirect-heating rotary dryers similar to those described above and may be any dryer, if the drying article is conveyed continuously and heated simultaneously. For example, a steam tube dryer having a plurality of steam tubes for heating installed in the axial direction on the inner surface of a drum may be used. The heating medium is not limited to steam and may be any known heating medium that can be heated to about 200° C., such as oil, alkylbenzene, or alkylnaphthalene.

The first and second dryers are preferably tubular dryers, and particularly preferably steam tube dryers. As described above, the oil present in a relatively large amount on the porous coal surface portion is vaporized, which is a process rate-limited by energy supply, and thus, relatively large heat energy is needed to be supplied even in a short period of time in the first drying step. In the second drying step, the residual oil in the porous coal diffuses and exudes onto the surface and vaporizes, which is a process rate-limited by time, and the heat energy should be supplied over a relatively long period. Thus, the heat energy supplied in the second drying step may be made smaller than that supplied in the first drying step, which is preferable, from the viewpoint of drying efficiency. In the case of the tubular dryer, it is possible, in such setting, to control the quantity of the heat energy easily, only by modifying the number of the tubes.

Figure 5:
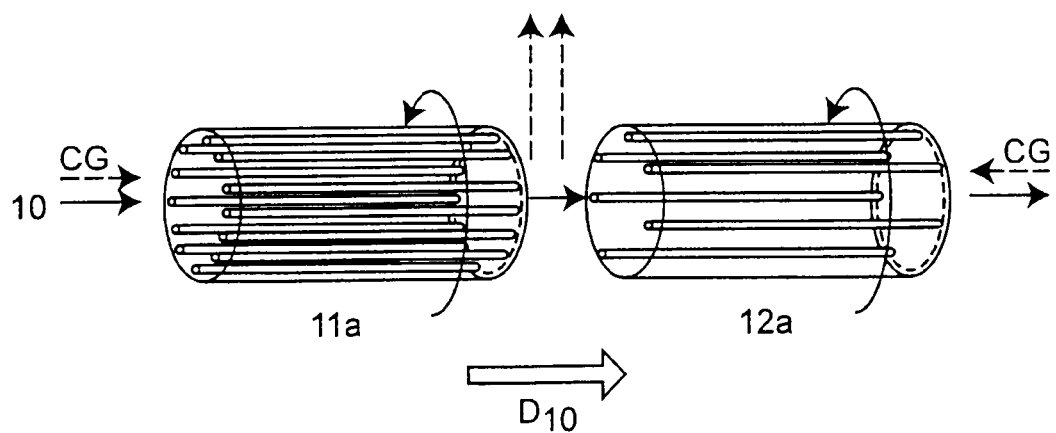
FIG. 5 is a schematic view illustrating a specific example of the final drying step in the method of producing a solid fuel according to the present invention.

Specific examples of the steam tube dryer for the first dryer and the steam tube dryer for the second dryer are shown in FIG. 5. In FIG. 5, the number of the tubes in the first steam tube dryer 11$a$ is set to be larger than that in the steam tube dryer for the second dryer 12$a$. The dryers 11$a$ and 12$a$ agitate and heat the modified porous coal 10 therein and convey it in the direction $D_{10}$, as they revolve. On the other hand, the carrier gas is supplied from both ends, and discharged from the center together or separately.

The carrier gas supplied through the first dryer 11 and the carrier gas supplied through the second dryer 12 may be regenerated and recycled together or separately. These carrier gases contain vaporized oil, and therefore are normally mixed together and recovered after condensation of the vaporized oil by cooling. Such a carrier gas contains porous coal fine powder (dust coal) and the fine powder coal may be captured and removed. As a result, the vaporized oil is recovered, and the carrier gas, from which dust coal is removed as needed, is circulated and reused.

Figure 6:
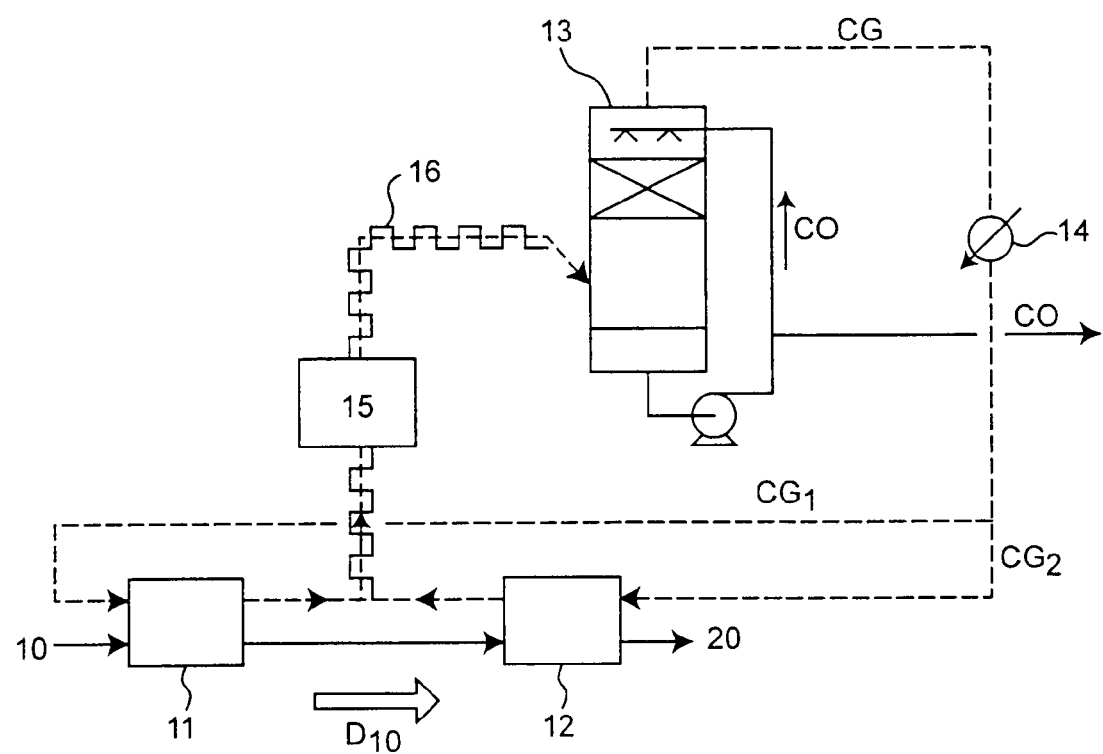
FIG. 6 is an entire configuration chart showing an embodiment of the final drying step in the method of producing a solid fuel according to the present invention.

For example as shown in FIG. 6, a drying apparatus regenerating the carrier gas collectively has a first dryer 11, a second dryer 12, a gas cooler 13, and a gas heating device 14, and normally includes a dust-collecting device 15 and a heater 16 additionally.

In the drying apparatus 6 shown in FIG. 6, the modified porous coal (cake) 10 separated in the solid-liquid separation step is heated to about 150 to 250° C. while conveyed in the first dryer 11, for example over a period of about 30 to 120 minutes, for vaporization of the oil fraction, particularly the solvent oil fraction, on the porous coal particle surface portion. Simultaneously, a carrier gas ($CG_1$) is supplied in the co-current (same) direction with respect to the modified porous coal-conveying direction $D_{10}$ and the vaporized oil fraction is discharged and removed from the first dryer 11, before the end of the processing in the first drying step. Then, the modified porous coal processed in the first drying step is heated to about 150 to 250° C. while conveyed in the second dryer 12, for example over a period of about 30 to 120 minutes, for vaporization of the oil rfaction, in particular the solvent oil fraction, in the porous coal particles. Simultaneously, a carrier gas ($CG_2$) is supplied in the counter-current flow (opposite) direction with respect to the modified porous coal-conveying direction $D_{10}$, for discharge and removal of the vaporized oil fraction from the second dryer 12 before the end of the processing in the second drying step, to give a dried porous coal 20. the carrier gas supplied through the first dryer 11 and the carrier gas supplied through the second dryer 12 are combined, and the dust coal is removed in a dust-collecting device 15. Then, the vaporized oil fraction in the carrier gas is condensed, as it is cooled in a gas cooler 13, and the dust coal in the carrier gas is captured and removed while the condensed oil fraction is sprayed. The carrier gas (CG) from which the dust coal and the vaporized oil fraction are removed is circulated after it is heated in a gas heating device 14 and used as the carrier gas ($CG_1$) for the first drying step and the carrier gas ($CG_2$) for the second drying step. A heater 16 is normally installed on the carrier gas line from the dryers (11, 12) to the dust-collecting device 15, and the carrier gas line from the dust-collecting device 15 to the gas cooler 13, for prevention of condensation of the vaporized oil fraction during feed of the carrier gas. The oil fraction (mixed oil) recovered in the gas cooler 13 may be sent back to the mixing step, where it is circulated and used as a medium (circulation oil (CO)) for preparation of the raw slurry.

The dried modified porous coal is cooled and molded as needed, to give a solid fuel (cooling step and molding step in FIG. 3). For example, it may be used as a powdery solid fuel as it is cooled in the cooling step or as a molded solid fuel after cooled in the cooling step and molded in the molding step. It may be molded in the molding step without cooling, to give a molded solid fuel.

Figure 7:
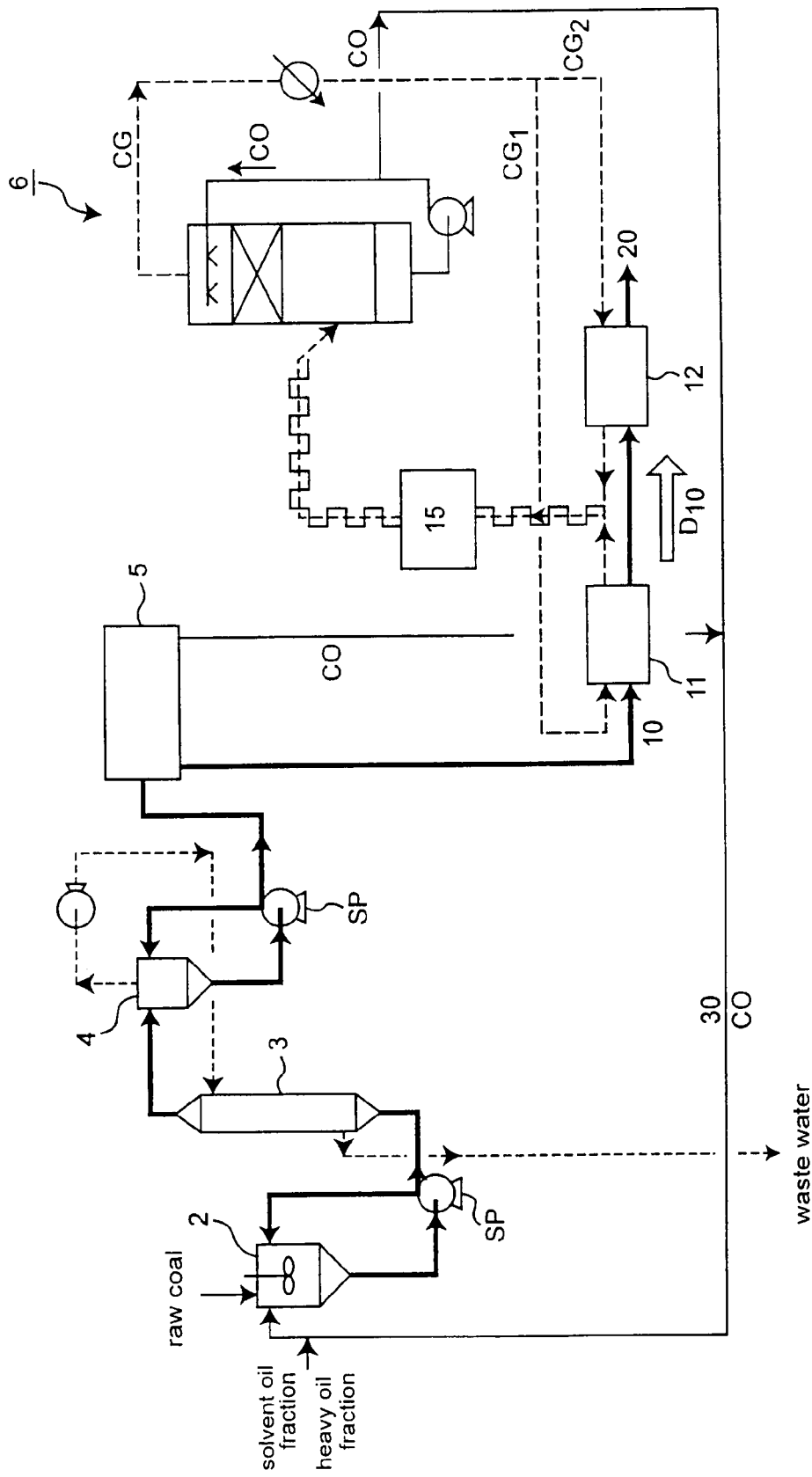
FIG. 7 is a schematic view showing an embodiment of a production system for production of a solid fuel according to the present invention.

An example of the apparatus for production of a solid fuel according to the present invention is shown in FIG. 7. FIG. 7 is a schematic view showing an example of the apparatus for production of a solid fuel, employing the pulverization to final drying steps in the method of producing a solid fuel according to the present invention shown in FIG. 3. Specifically, the pulverizer (not shown in the Figure), the mixing tank 2, the preheater 3, the vaporizer 4, the solid-liquid separation device 5, and the drying apparatus 6 in FIG. 7 are respectively means to carry out the pulverization step, the mixing step, the preheating step, the vaporization step, the solid-liquid separation step, and the final drying step shown in FIG. 3 above. The drying apparatus 6 is a device similar to the dryer shown in FIG. 6.

For example as shown in FIG. 7, the production system for production of a solid fuel according to the present invention contains at least:

a mixing tank 2 for obtaining a raw slurry by mixing a porous coal with a mixed oil containing a heavy oil fraction and a solvent oil fraction;

a vaporizer 4 for obtaining a dehydrated slurry by enhancing dehydration of the porous coal by heating the raw slurry and impregnation of the mixed oil into the micropores of the porous coal;

a solid-liquid separation device 5 for separating a modified porous coal and a mixed oil from the dehydrated slurry; and a drying apparatus 6 for drying the separated modified porous coal by supplying a carrier gas (CG) over it while heating and conveying it, wherein the drying apparatus 6 is an indirect heat-drying apparatus, specifically containing a first dryer 11 in which the carrier gas ($CG_1$) is supplied co-currently to the modified porous coal-conveying direction and a second dryer 12 in which the carrier gas ($CG_2$) is supplied counter-currently to the modified porous coal-conveying direction, in the order from the upstream in the coal-conveying direction ($D_{10}$) of the modified porous coal 10.

As shown in FIG. 7, the system according to the present invention normally includes a pulverizer (not shown in the Figure) and a preheater 3, and, a condenser (not shown in the Figure) and a molding machine (not shown in the Figure), as needed.

The steam vaporized in the vaporizer 4 is compressed and used as the heat source for the preheater 3 and then exhausted.

EXAMPLES

Experimental Example 1

Indirect Heat-Drying Apparatus and Indirect Heat-Drying Method

Described is an example of the drying step of obtaining a product from a wet cake of a mineral containing high-boiling point hydrocarbons as liquid components by drying and recovering the hydrocarbons, and the amount of the product is about 30 Ton/h.

The liquid content of the raw wet cake is 20 to 30 wt % by weight WB, and the wet cake is supplied into a dryer at 100 to 150° C. The liquid content required for the product is 1.5 to 0.5 wt % by weight WB. The critical liquid content is 10 to 2 wt % by weight WB, and drying both in constant-rate drying range and decreasing-rate drying range is needed in the present drying step. A circulation system in which $N_2$ gas is used as the carrier gas is employed for recovery of the vaporized liquid components. The boiling points of the liquid fraction are 150 to 250° C., and it is needed to keep the cake at a temperature of 210° C. or higher under low-dew point atmosphere in the decreasing-rate drying range for obtaining a liquid content preferable for the product.

Comparative Example 1 (conventional Example) is an apparatus wherein drying in constant rate drying range and decreasing-rate drying range is carried out in one steam tube dryer, having a circulation system in which the carrier gas is supplied counter-currently.

Example 1 (an example of the present invention shown in FIG. 1) is an apparatus wherein: two steam tube dryers are arranged in series, drying in constant-rate drying range is carried out in the first-stage dryer while the carrier gas is supplied co-currently, and drying in decreasing-rate drying range is carried out in the latter-stage dryer while the carrier gas is supplied counter-currently; the dust collectors respectively have bag filters; and the carrier gas is circulated in separate circulation systems.

The two drying steps are compared in Table 1.

TABLE 1

|  | Comparative Example 1 | Example 1 |
| --- | --- | --- |
| Form of drying step | One dryer (conventional) | Two dryers in series (present invention) |
| Flow mode of carrier gas | Counter-current | Former stage: co-current Latter stage: counter-current |
| State of dryer inlet port | Adhesion observed because of high dew point, low cake temperature, and low gas temperature. Gas temperature: about 140° C. Gas dew point: about 125° C. Cake temperature: about 135° C. | Former stage: no adhesion observed because of low dew point and high gas temperature Gas temperature: about 210° C. Gas dew point: about 80° C. Cake temperature: about 135° C. Latter stage: no adhesion observed because of high cake temperature and high gas temperature Gas temperature: about 210° C. Gas dew point: about 110° C. Cake temperature: about 215° C. |

TABLE 1-continued

|  | Comparative Example 1 | Example 1 |
|---|---|---|
| Kind of dust collector | Wet scrubber<br>Gas temperature: about 140° C.<br>Gas dew point: about 125° C.<br>Additional processing needed because of recovery of the collected dust as slurry | Former and latter stages: dry bag filter<br>Former stage: Gas temperature: about 210° C.<br>Gas dew point: about 140° C.<br>Latter stage: Gas temperature: about 210° C.<br>Gas dew point: about 110° C.<br>Collected dust used as a product, back in the dryer. |
| Liquid content of product | Short pass possibly occurring, because constant-rate drying and decreasing-rate drying are carried out in a single dryer. Fluctuated in about 2 to 1 wt % by weight. | A dryer only for decreasing-rate drying is used in the latter stage.<br>Stabilized at about 1 wt % by weight. |
| Dryer size<br>Heat transfer area | φ3800 × 33 mL<br>Heat transfer area: about 2200 m² | Former stage: φ3050 × 20 mL<br>Heat transfer area: about 1100 m²<br>Latter stage: φ3050 × 20 mL<br>Heat transfer area: about 600 m² |
| Carrier gas flow rate | about 9800 Nm³/h | Former stage: about 4800 Nm³/h<br>Latter stage: about 3900 Nm³/h |
| Gas heater vapor quantity | about 1300 kg/h | Former stage: about 550 kg/h<br>Latter stage: about 500 kg/h |

The results in Table 1 show that use of two dryers in series (Example 1) is advantageous in that deposition amount on the inlet port of the dryer is smaller and a product having a stabilized liquid content is obtained. It is also advantageous in that the dust scattered with the exhaust gas can be recovered as a product and no slurry is generated. The heat transfer coefficient can be raised because the adhesion amount is smaller, and the heat transfer area of the dryer can be reduced. It is possible to reduce the carrier-gas flow rate and the amount of the vapor needed for heating the carrier gas. In addition, the liquid content of the dried substance is stabilized.

More specifically, if the drying step is carried out by using one dryer in the counter-current flow mode of the carrier gas, as in the conventional example (Comparative Example 1), the exhaust gas contains the evaporant and thus has a high dew point. The exhaust gas is brought into contact with the substance to be dried in the low-temperature wet state, resulting in drop of the gas temperature and decrease in temperature difference between the gas temperature and the dew point. Although the gas temperature is adjusted to about 140° C. with respect to the dew point of about 125° C. by adjusting the flow rate of the carrier gas, in the conventional example, the temperature difference may become only about 1 to 2° C. or lower, prohibiting installation of bag filter because of dewing.

When two dryers are installed in series and the carrier gas flow mode is co-current in the former stage and counter-current in the latter stage according to the present invention (Example 1), the exhaust gas from the dryer in the former stage has a high dew point, but the substance to be dried with which the exhaust gas becomes in contact in the gas outlet region is higher in temperature, and thus, the gas temperature does not drop. The exhaust gas from the dryer in the latter stage contains only the evaporant generated in the decreasing-rate drying range and thus can be set to a low dew point easily. In addition, the temperature of the substance to be dried in contact with the gas is also high, and the gas temperature remains high. In the present Example, the temperature difference between the substance to be dried and the exhaust gas is about 70 to 100° C., and thus, bag filters can be installed without dewing for treatment of the exhaust gases from both dryers in the former and latter stages.

On the other hand, the dew point of the carrier gas should be lowered, for reducing the liquid content to a particular point in a particular residence time by drying in decreasing-rate drying range. When the drying step is carried out in one dryer, as in the conventional example, the dew point of the entire carrier gas should be lowered and then, reheated before circulation into the dryer, which results in large loss of energy. According to the present invention, only the dew point of the carrier gas supplied into the dryer in latter stage which is used for drying in decreasing-rate drying range is dropped. In Example 1, a carrier gas having a dew point of about 45° C. is needed for drying in decreasing-rate drying range, but the gas heated to about 45° C. may be only the carrier gas supplied to the dryer in the latter stage, and the dew point of the carrier gas supplied to the dryer in the former stage is kept about 80° C. It is thus possible to reduce the amount of the steam needed for heating the carrier gas by about 20%.

Experimental Example 2

Method and Apparatus of Producing a Solid Fuel and Production

The present invention will be described more in detail with reference to the following Examples. The term "part" below is to be understood to mean "part by weight".

Example 2

An apparatus similar to that shown in FIG. 7, except that the preheater is eliminated, was operated continuously under the following conditions:
Pulverization Step
Samarangau coal (maximum particle size: 3000 μm, average particle size: about 150 μm)
Mixing Step
A newly prepared mixed oil [kerosene: 1 kg/hour and asphalt: 1 kg/hour] was supplied to Samarangau coal (180 kg/hour) and a circulation oil (248 kg/hour), to give a raw slurry (70° C., 100 kPa).

Vaporization Step
Supply rate of the raw slurry into vaporizer: 430 kg/hour
137° C., 400 kPa
Solid-Liquid Separation Step
130° C., 100 kPa
Final Drying Step The first dryer: steam-tube dryer (number of tubes: 12, length in axial direction: 5000 mm, heating temperature (carrier gas ($CG_1$) temperature): about 210° C., modified porous coal residence time: 60 minutes.

The second dryer: steam-tube dryer (number of tubes: 6 (+6 tubes not supplying steam), length in axial direction: 5000 mm, heating temperature (carrier gas ($CG_2$) temperature): about 210° C., modified porous coal residence time: 60 minutes In Example 2, a modified porous coal was obtained immediately after the final drying step at a rate of 100 kg/hour.

Comparative Example 2

Figure 8:
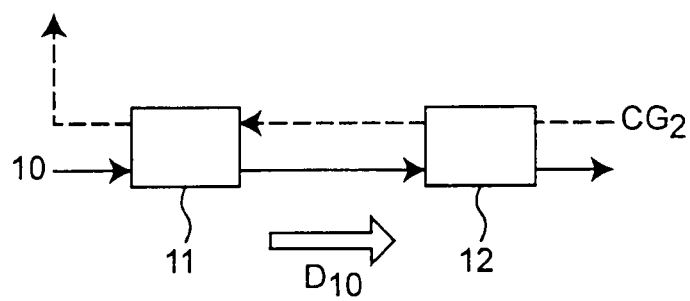
FIG. 8 is a schematic view showing a relationship among a first dryer, a second dryer, and a carrier gas flow direction employed in the final drying step of Comparative Example 2.
Figure 9:
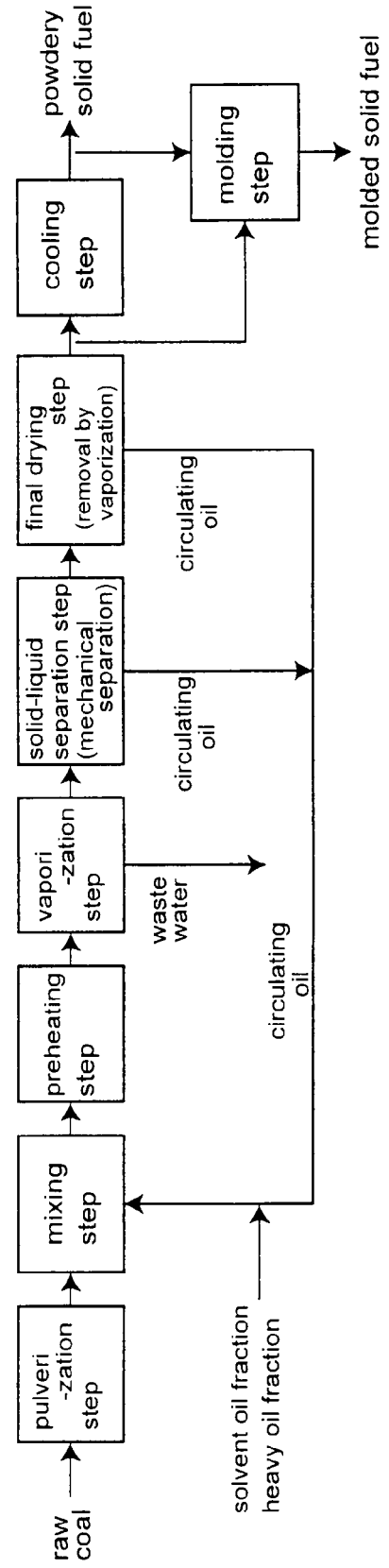
FIG. 9 is a process flow chart showing a conventional method of producing a solid fuel.
Figure 10:
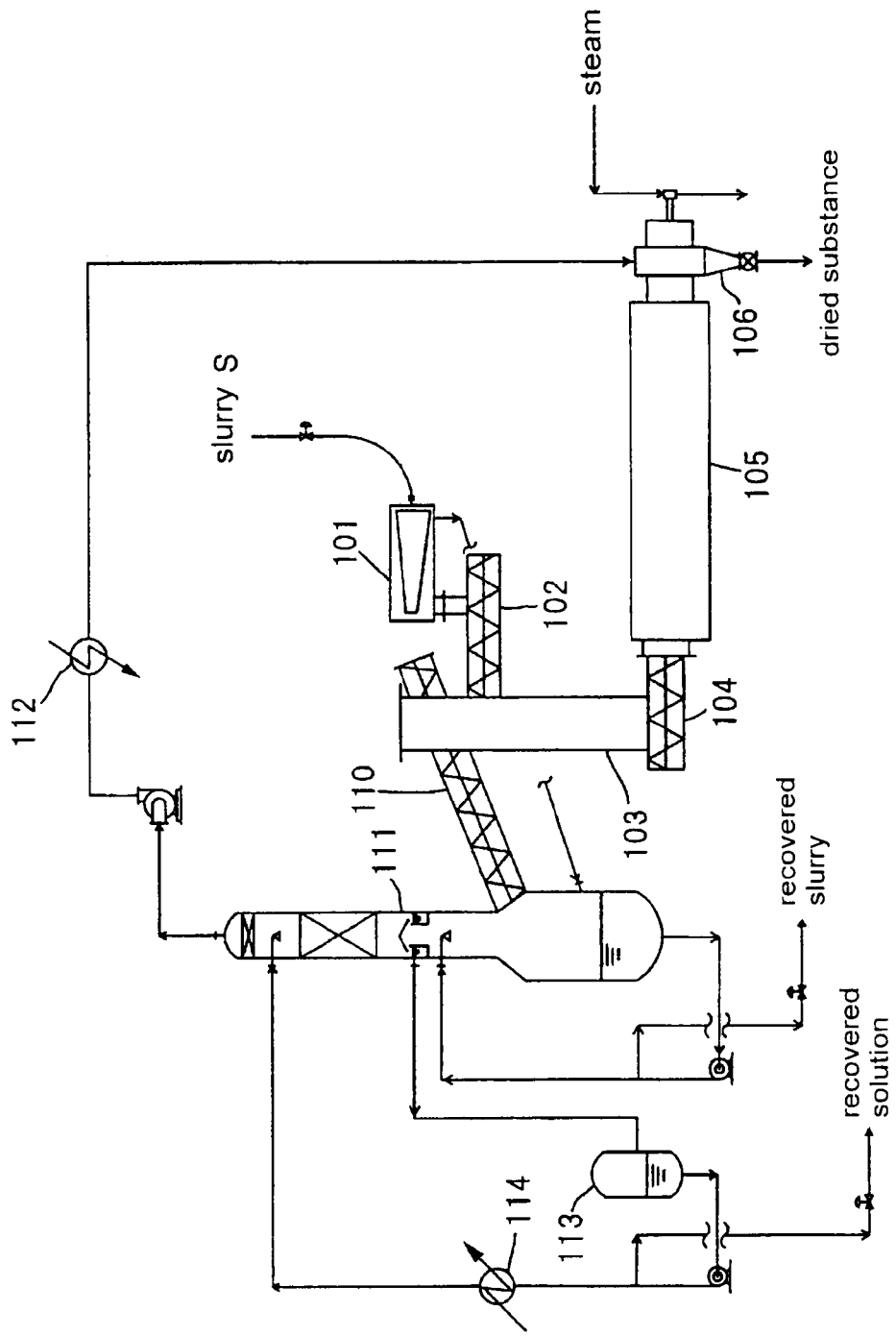
FIG. 10 is a flow chart showing a conventional drying method.

Drying operation was carried out continuously in a manner similar to Example 2, except that the following drying apparatus was used.
Drying Apparatus;

Used was a drying apparatus similar to that shown in FIG. 6, except that a steam-tube dryer identical with the first dryer was used as the second dryer, the carrier gas ($CG_2$) was also supplied into the first dryer in the direction shown in FIG. 8 without use of carrier gas ($CG_1$), and the carrier gas discharged from the first dryer 11 was supplied to the dust-collecting device 15.

In Comparative Example 2, sufficient drying was not possible under a condition similar to that in Example 2, because the modified porous coal deposited in the area around the porous coal inlet of the first dryer, particularly on the heating tubes. Thus, sufficient drying was carried out, as the conveying speed of the porous coal in the first and second dryers was reduced for assurance of drying period, to give a modified porous coal at a rate of 60 kg/hour, immediately after the final drying step.

The amount of the steam consumed with respect to the weight of the modified porous coal in Comparative Example 2 was increased by about 10%, compared to that in Example 2.

INDUSTRIAL APPLICABILITY

The indirect heat-drying apparatus and the indirect heat-drying method of drying a substance to be dried according to the present invention are useful in drying various powders or grains, such as those of porous coal and biomass.

The method and the apparatus of producing a solid fuel according to the present invention are useful in production of a solid fuel from a raw material of porous coal (coal), particularly of low-quality coal.

The invention claimed is:

1. An indirect heat-drying apparatus comprising a first and second indirect-heating rotary dryer, each comprising:
    a revolving cylinder configured to freely revolve about its axial direction;
    a plurality of heating pipes arranged in the revolving cylinder in parallel with the revolving cylinder axis;
    a carrier gas treatment system configured to supply a carrier gas into the revolving cylinder from one side of the revolving cylinder and to discharge the gas with evaporant out of the system from another side of the revolving cylinder,
    wherein a substance to be dried is supplied from a first side of the revolving cylinder and a dried substance is discharged out of a second side opposite thereto,
    wherein the first and second rotary dryers are arranged in series so that a dried substance from the first indirect-heating rotary dryer is supplied to and dried in the second indirect-heating rotary dryer as a substance to be dried, and
    wherein the apparatus comprises a carrier gas supplier configured to supply the carrier gas co-currently in the first indirect-heating rotary dryer and counter-currently in the second indirect-heating rotary dryer with respect to the flow direction from substance to be dried to dried substance.

2. The indirect heat-drying apparatus of claim 1, further comprising:
    a first bag filter configured to collect dust contained in the carrier gas discharged from the first indirect-heating rotary dryer;
    a second bag filter configured to collect dust contained in the carrier gas from the second indirect-heating rotary dryer;
    and a mixer configured to mix the collected dusts with the dried substance discharged from the first indirect-heating rotary dryer.

3. The indirect heat-drying apparatus of claim 1, further comprising:
    carrier gas circulation systems configured to circulate the carrier gas discharged from the first indirect-heating rotary dryer and the carrier gas discharged from the second indirect-heating rotary dryer respectively back to inlet sides; and
    a cooler, which is equipped at least in the second carrier gas circulation system and configured to lower the dew point of the carrier gas sent back to the second indirect-heating rotary dryer.

* * * * *